Patented Apr. 27, 1937

2,078,279

UNITED STATES PATENT OFFICE 2,078,279

PROCESS FOR MAKING TITANIUM DIOXIDE

Hartmut W. Richter, Rahway, N. J., assignor, by mesne assignments, to American Zirconium Corporation, Baltimore, Md., a corporation of Maryland No Drawing. Application April 13, 1934, Serial No. 720,437

5 Claims. (Cl. 23—202)

This invention relates to the manufacture of titanium dioxide, and has particular reference to a method for hydrolyzing solutions of titanium compounds which are normally difficult to hydrolyze, to obtain good yields of titanium precipitates, by carrying on the hydrolysis in the presence of a specially prepared titanium dioxide, which is relatively insoluble in the hydrolysis solution.

The manufacture of titanium dioxide for use as a pigment has generally been effected by attacking by various methods a titanium bearing mineral such as ilmenite (largely iron titanate) or rutile (largely titanium dioxide) to render the titanium soluble, then preparing a solution of titanium salt, from which the titanium is precipitated as a hydroxide; and calcining to the oxide form.

In the very early stages of the art, the titanium was precipitated by alkali; this method gives very poor quality titanium dioxide pigment. The next method used was precipitation of the hydroxide by hydrolysis of very dilute solutions—containing about 3–5% or less of titanium dioxide. This method gives better pigment material, but is slow and uneconomical, because of the large volumes of solution needed. The Fladmark Patent 1,288,863 of Dec. 24, 1918, marked the next step in the art—precipitation by boiling, in air, or at high temperatures and pressures in an autoclave, of fairly concentrated solutions of titanium dioxide (80–250 grams per liter), regulating the content of sulfuric acid so that the titanium was present not as the normal salt—$Ti(SO_4)_2$—but as a salt having a sulfate content between $Ti(SO_4)_2$ and $TiOSO_4$. (In the parlance of the art, the constitution of the solution is expressed as factor of acidity (F. A.), the $TiOSO_4$ having FA=0, the $Ti(SO_4)_2$ having FA=100, intermediate figures—representing varying percentages of acid combined with the titanium oxide.) The high concentrations used permit the recovery of the acid from the hydrolysis solution.

The concentrated, low acid solutions yield good pigment titanium dioxide; but the hydrolysis requires very prolonged heating to insure good yields, or heating for shorter periods at such high temperatures—as to require autoclave pressures.

In order to hasten the precipitation at atmospheric conditions, various methods have been devised. Blumenfeld (Reissues 17,429 and 17,430, Sept. 10, 1929, and Re. 18,854, May 10, 1933) suggests a slow admixture of water with the solution or (U. S. P. 1,851,487 of Mar. 29, 1932) the use of a colloidal solution of titanium dioxide prepared by the same method; Mecklenburg (Reissue 18,790—Apr. 4, 1933) proposes to precipitate titanium hydrate by the use of a caustic alkali and heat the mixture to obtain a seed suspension. Rhodes (U. S. P. 1,922,328—Aug. 15, 1933) makes a seed suspension by treating an alkali titanate with hydrochloric acid, obtaining a suspension of titanium dioxide in an alkali chloride solution. Richter (U. S. P. 1,947,226—Feb. 13, 1934) uses a very low F. A. sulfate solution, prepared from titanium dioxide obtained by leaching an alkali titanate.

The exact mechanism of the hydrolysis is not known; some workers in the art believe it to be due to the presence or formation of colloidal titanium oxide particles which coagulate to form a precipitate.

I have discovered that the hydrolysis of titanium salt solutions may be hastened and brought to early substantial completion, by the use of specially prepared dry titanium dioxide concentrates which are relatively insoluble in the hydrolysis solutions.

It should be pointed out that this is a radical departure from the seeding theories and practice of the prior art. Blumenfeld at all times uses a solution of colloidal titanium dioxide, either prepared in situ (Reissue Patents 17,429, 17,430 and 18,854) or added to the solution (U. S. P. 1,851,487). Richter (U. S. P. 1,947,226) uses a salt solution of low F. A., while Mecklenburg (Reissue 18,790) and Rhodes (U. S. P. 1,922,328) use suspensions of titanium dioxide which dissolve to give clear solutions in the titanium solutions to be hydrolyzed.

My dry titanium dioxide concentrates are not new in the art. They are prepared by fusing or fritting, with an alkali or alkali-reacting compound, a titanium bearing mineral, or prepared titanium oxide. Ilmenite rutile etc. may thus be treated with caustic soda or caustic potash, soda ash, or sodium sulfide, to produce an alkali titanate. The titanate is leached with water, and/or dilute sulfuric acid; the caustic etc. is thus washed away, together with impurities like silica and alumina, leaving a concentrated titanium dioxide, which I wash, filter and dry. Such a concentrate from ilmenite is shown in the Barton Reissue Patent 14,289 of Apr. 24, 1917; the method of preparation is disclosed in the Rossi and Barton Patents 1,106,409 and 1,106,410, of Aug. 11, 1914. A similar titanium oxide, prepared from rutile, is described in the Richter Patent 1,932,067, of Oct. 24, 1933.

These dried concentrates are soluble in hot sulfuric acid of 50% concentration or higher, and yield sulfate solutions from which titanium dioxide may be prepared, as shown by Barton and Richter. They are, however, relatively insoluble in the difficultly hydrolyzable titanium solutions with which they may be used to accelerate complete precipitation.

In a preferred form of my invention, I frit 100 parts of rutile with 100 parts of caustic soda, in 75% solution in water. The mass is kneaded, with addition of 25 parts of dry sodium carbonate, until the temperature reaches 300° C. The paste is then transferred to a calcining furnace, and heated at 600–650° C. for 30 minutes. The granular powder is leached with hot water to remove the bulk of the caustic; this is followed by extraction with very dilute sulfuric acid, to remove substantially all of the residual caustic. The oxide concentrate is then dried at 110° C. and is ready for use.

The solutions to be hydrolyzed may be prepared in any manner well known to the art. Rutile or ilmenite may be attacked with sulfuric acid; the acid may be used in sufficient quantity to give a normal sulphate or a basic sulphate solution, as desired. The mass is dissolved; iron is preferably reduced to the ferrous state, and removed by crystallization as copperas. The resultant solution is adjusted as to concentration of titanium, and as to acidity if desired. Such solutions are shown in the Fladmark Patent 1,288,863, and are commonly used in the art. The titanium oxide content may vary from 100–300 grams per liter, although 200–250 is the preferred range; the factor of acidity is preferably between 60 and 90, although normal salt solutions may be satisfactorily hydrolyzed.

These solutions may be hydrolyzed to give substantially complete yields, by heating them to boiling at atmospheric pressure, after adding thereto approximately 1–10% of my dried concentrate, based on the weight of titanium dioxide in the solution. Hydrolysis may, of course, be hastened by heating at higher than atmospheric pressures, in an autoclave. The open boiling may be replaced to advantage by boiling under a reflux.

As an example of my invention, I prepared a titanium sulfate solution containing 177 grams of titanium dioxide, and 440 grams of sulfuric acid per liter. I boiled 400 cc. of this solution for 5 hours under a reflux condenser; at this time, the solution had precipitated only 11% of its titanium dioxide content. Another 400 cc. of the same solution was treated in the same way, in the presence of 6 grams of my titanium oxide concentrate. After 5 hours, the hydrolysis was substantially complete, 91.5% of the titanium dioxide having been precipitated from the solution. At no time was the solution clear, the added oxide remaining as a murky white cloud in the solution.

After precipitation, the hydrated oxide is filtered from the acid solution, which is concentrated for further use. The oxide is carefully washed and calcined at 800–1000° C.; this drives off the water of hydration, and the sulfuric acid which would not wash out. The calcined pigment is wet ground to improve its pigment properties, and dried.

The exact mechanism of the hydrolysis is unknown to me; I assume that my concentrate is in such crystal form that the particles act as seeding centers about which the titanium oxide in solution may coagulate. This assumption is strengthened by the fact that neither titanium oxide hydrolyzed out of the solution nor alkali precipitated hydroxides act in the same way— the former does not accelerate hydrolysis, the latter goes into clear solution in the hydrolysis bath.

My invention is not limited as to exact composition of titanium dioxide concentrate used, as this depends on the raw material which is utilized in the preparation thereof. The term titanium oxide in the claims therefore refers to the more or less pure concentrates of titanium dioxide obtained from various raw materials, by reacting upon it with caustic alkali or its equivalent, removing impurities and drying.

As indicated above, the hydrolysis solutions may vary as to concentration and acidity, and various methods of hydrolysis (open boiling, boiling under reflux or in an autoclave) may be used without departing from the spirit of my invention.

Having described my invention, I claim—

1. In a process for preparation of titanium dioxide, the step which comprises hydrolyzing a titanium salt solution in the presence of a titanium oxide concentrate prepared by leaching an alkali titanate with water and/or weak acid, and drying the concentrate.

2. In a process for the preparation of titanium dioxide, the step which comprises hydrolyzing a titanium salt solution in the presence of a titanium oxide concentrate prepared by reacting a titanium bearing material with a caustic alkali, treating the reaction product with water and/or weak acid to remove substantially all of the alkali and drying the concentrate.

3. In a process for the preparation of titanium dioxide, the step which comprises hydrolyzing a titanium salt solution in the presence of a titanium oxide concentrate which is an accelerator for the hydrolysis, but which does not yield a clear solution, the concentrate being prepared by leaching an alkali titanate with water and/or weak acid and drying.

4. In a process for the preparation of titanium dioxide, the step which comprises hydrolyzing a titanium salt solution in the presence of a titanium oxide concentrate which is an accelerator for the hydrolysis, but which does not yield a clear solution, the concentrate being prepared by reacting a titanium-bearing material with a caustic alkali, and treating the reaction product with water and/or weak acid to remove substantially all of the alkali and drying.

5. The method of hydrolyzing a titanium salt solution, which comprises heating the solution in the presence of a titanium oxide concentrate prepared by reacting a titanium bearing material with an alkali, and treating the reaction product with water and/or weak acid to remove substantially all of the alkali and drying.

HARTMUT W. RICHTER.